Patented Apr. 16, 1935

1,998,010

UNITED STATES PATENT OFFICE 1,998,010

METHOD OF PURIFYING SILVER IODIDE

Charles W. Girvin, Long Beach, Calif., assignor to Deepwater Chemical Co., Ltd., Los Angeles, Calif., a corporation of California No Drawing. Application October 26, 1933, Serial No. 695,331

12 Claims. (Cl. 23—216)

This invention relates to methods of purifying water-insoluble metal iodides, such as silver iodide, and has particular regard to the purification of the crude silver iodide precipitate which is obtained in the treatment of oil field waste waters, brines, etc. with a silver salt according to the method of recovering iodine therefrom as described in U. S. Patent No. 1,837,777. Such silver iodide precipitate may be more or less contaminated by other silver halides and also with organic impurities contained in the waste water or brine which are absorbed by the precipitate.

It is an object of the present invention to provide a simple and practical method of purifying such silver iodide so as to enable the subsequent preparation therefrom of pure iodine or commercial iodine compounds.

The crude silver iodide precipitate recovered as aforesaid contains small amounts of silver bromide and silver chloride, as well as iron hydroxide, dirt, organic matter, etc. The presence of organic matter is often a source of especial difficulty in the purification methods as heretofore employed. Some of the organic matter may be volatilized or carbonized by heating the crude silver iodide, but it cannot always be completely removed in this way.

According to the invention, the crude silver iodide, preferably after being heated to remove or carbonize as much organic matter as possible, is dissolved in a strong aqueous solution of a water-soluble metal iodide, for instance an alkali metal iodide such as potassium iodide or sodium iodide. The strong iodide solution reacts with the silver bromide and silver chloride in the crude material to convert the said halides to silver iodide and the corresponding soluble chloride or bromide, according to the following typical equation:—

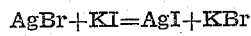

$$AgBr + KI = AgI + KBr$$

The insoluble impurities, such as iron hydroxide, dirt, organic matter, etc., are separated from the solution by filtration. The clear filtrate is then diluted with water, thereby reprecipitating the silver iodide, while the soluble chloride and bromide remain in solution. The silver iodide precipitate contains all of the silver and iodine of the original crude product, but is purified of the accompanying chlorides and bromides, as well as organic matter, dirt and other foreign matter. The purified silver iodide is filtered from the solution, washed with water, and then may be used for the preparation of iodine or commercial iodine compounds, according to well known methods.

In actual practice the method of the invention has been employed to prepare potassium iodide, for instance, from crude silver iodide recovered from oil field brines or waste waters. The crude silver iodide is first subjected to a sufficiently high temperature to volatilize or carbonize organic matter contained in it. It is then treated with a sufficient excess of a nearly saturated aqueous potassium iodide solution to dissolve all of the silver iodide and other accompanying silver halides, whereby such halides are converted to silver iodide with formation of the corresponding potassium halides. The solution of silver and potassium halides is filtered from insoluble matter, and the clear filtrate is diluted with several times its volume of water so as to reprecipitate silver iodide, while the water-soluble potassium halides remain in solution. The reprecipitated silver iodide is filtered out and washed, being thus separated in a high degree of purity.

Potassium iodide may then be prepared from the pure silver iodide in any known manner; for example, by redissolving in potassium iodide solution, precipitating the silver by reduction with a metal such as zinc to leave zinc iodide in solution, adding potassium carbonate to such solution to precipitate zinc carbonate, filtering off the latter, leaving a substantially pure solution of potassium iodide, from which the salt may be crystallized.

By similar procedure the crude silver iodide may be dissolved in a strong solution of any suitable iodide which will convert the silver chloride and bromide present to water-insoluble silver iodide and a water-soluble chloride and bromide, the solution being filtered from insoluble matter, then diluted to reprecipitate silver iodide, which is separated from the solution of water-soluble salts. Specifically, a solution of sodium iodide or other alkali metal iodide, instead of potassium iodide, may be utilized for dissolving the crude silver iodide.

It will be apparent also that a similar method of purification may be employed for other water-insoluble metal iodides, such as mercurous iodide and cuprous iodide, whereby such crude metal iodide is dissolved in a concentrated solution of an alkali metal iodide, the solution filtered from insoluble impurities, and the filtered solution diluted with water to reprecipitate the water-insoluble metal iodide.

This application is a continuation-in-part of my prior application, Serial No. 570,153, filed October 21, 1931.

Other modes of applying the principle of my invention may be employed instead of those explained, change being made as regards the method herein disclosed, provided the step or steps stated by any of the following claims or the equivalent of such stated step or steps be employed.

I therefore particularly point out and distinctly claim as my invention:—

1. The method of purifying crude silver iodide which is contaminated with other silver halides, which comprises dissolving the contaminated crude product in a concentrated aqueous solution of potassium iodide, diluting the solution so as to precipitate silver iodide, and separating the silver iodide.

2. The method of purifying crude silver iodide which is contaminated with other silver halides, which comprises dissolving the contaminated crude product in a concentrated aqueous solution of potassium iodide so as to convert the contaminating silver halides to silver iodide and potassium salts of said contaminating halides, diluting the solution so as to precipitate silver iodide while retaining the potassium halides in solution; and separating the silver iodide.

3. The method of purifying crude silver iodide, which comprises dissolving it in a concentrated aqueous solution of potassium iodide, filtering out insoluble impurities, diluting the solution so as to precipitate silver iodide, and separating the silver iodide from the solution.

4. The method of purifying crude silver iodide, which comprises heating it so as to separate organic impurities, dissolving it in a concentrated aqueous solution of potassium iodide, filtering out insoluble impurities, diluting the solution so as to precipitate silver iodide, and filtering the silver iodide from the solution.

5. The method of purifying crude silver iodide which is contaminated with other silver halides, which comprises dissolving the crude product in a concentrated aqueous solution of a water-soluble metal iodide which will decompose the contaminating silver halides and convert the same to silver iodide and water-soluble halides of the metal of said water-soluble iodide, diluting the solution to reprecipitate silver iodide, and separating the precipitated silver iodide from the aqueous solution.

6. The method of purifying crude silver iodide, which comprises dissolving the crude product in a concentrated aqueous alkali-metal iodide solution, diluting the solution to reprecipitate silver iodide, and separating the precipitated silver iodide from the aqueous solution.

7. The method of purifying crude silver iodide, which comprises dissolving the crude product in a concentrated alkali-metal iodide solution, separating insoluble impurities, diluting the solution to reprecipitate silver iodide, and separating the precipitated silver iodide from the aqueous solution.

8. The method of purifying crude silver iodide which comprises dissolving the crude product in a concentrated sodium iodide solution, diluting the solution to reprecipitate silver iodide, and separating the precipitated silver iodide from the aqueous solution.

9. The method of purifying crude silver iodide which comprises dissolving the crude product in a concentrated sodium iodide solution, separating insoluble impurities, diluting the solution to reprecipitate silver iodide, and separating the precipitated silver iodide from the aqueous solution.

10. The method of purifying a crude water-insoluble metal iodide which is contaminated with other water-insoluble halides, which comprises dissolving the crude product in a concentrated solution of a water-soluble iodide which will convert the contaminating halides to the water-insoluble metal iodide and water-soluble salts of the halides, diluting the solution so as to reprecipitate the water-insoluble metal iodide, and recovering the precipitate.

11. The method of purifying a crude water-insoluble metal iodide which is contaminated with other water-insoluble halides, which comprises dissolving the crude product in a concentrated solution of an alkali-metal iodide, diluting the solution so as to reprecipitate the water-insoluble metal iodide, and recovering the precipitate.

12. The method of purifying a crude water-insoluble metal iodide which is contaminated with other water-insoluble halides, which comprises dissolving the crude product in a concentrated solution of potassium iodide, diluting the solution so as to reprecipitate the water-insoluble metal iodide, and recovering the precipitate.

CHARLES W. GIRVIN.